United States Patent
Itoh et al.

(10) Patent No.: US 6,788,297 B2
(45) Date of Patent: Sep. 7, 2004

(54) PRESSURE SENSITIVE WRITING TABLET, CONTROL METHOD AND CONTROL PROGRAM THEREFOR

(75) Inventors: Hiroji Itoh, Zama (JP); Masaya Mori, Kawasaki (JP); Toshiroh Tabata, Kyouto (JP)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 10/078,794

(22) Filed: Feb. 19, 2002

(65) Prior Publication Data

US 2002/0113779 A1 Aug. 22, 2002

(30) Foreign Application Priority Data

Feb. 21, 2001 (JP) ........................................ 2001-044785

(51) Int. Cl.$^7$ .............................. G09G 5/00; G06K 9/00
(52) U.S. Cl. ...................... 345/179; 345/173; 382/181; 382/203
(58) Field of Search ................................ 345/173–183, 345/104; 178/18.01–18.11, 19.01–19.07; 382/202–203, 217–223, 187, 186, 181, 188, 189; 463/37–38

(56) References Cited

U.S. PATENT DOCUMENTS

| | | | | | |
|---|---|---|---|---|---|
| 5,488,204 | A | * | 1/1996 | Mead et al. | 178/18.06 |
| 5,835,081 | A | * | 11/1998 | Oka | 345/173 |
| 6,018,336 | A | * | 1/2000 | Akiyama et al. | 345/173 |
| 6,334,003 | B1 | * | 12/2001 | Yokota | 382/313 |
| 6,694,045 | B2 | * | 2/2004 | Chung et al. | 382/119 |

FOREIGN PATENT DOCUMENTS

| JP | 6-175777 | * | 6/1994 |
|---|---|---|---|
| JP | 2000-105665 | | 4/2000 |

* cited by examiner

*Primary Examiner*—Lun-Yi Lao
(74) *Attorney, Agent, or Firm*—Dillon & Yudell, LLP

(57) ABSTRACT

Since the surface of the touch panel is often slippery, pressure points of the writing stylus on a touch panel may easily skip along the input contiguous line. The present invention calculates the velocity of writing stylus movement at each segment of the input contiguous line from a touch location and detection time of each touch which may be detected at intervals, produces a line drawing which connects each pair of touch locations of touches that are temporally adjacent in the detection order with a line of a type determined based on the calculated velocity, and displays the line drawing on the LCD.

39 Claims, 7 Drawing Sheets

PRESSURE SENSITIVE WRITING TABLET, CONTROL METHOD AND CONTROL PROGRAM THEREFOR

BACKGROUND OF THE INVENTION

1. Field of the Invention

The present invention relates to a touch panel type pressure sensitive writing tablet for displaying characters and lines input by a user using a touch panel, a method of controlling this pressure sensitive writing tablet, a program for controlling this pressure sensitive writing tablet, and electronic paper.

2. Background of Related Art

Touch panels are widely used in machines such as automatic teller machines (ATMs) at banks, and ticket vending machines at train stations. The user touches a selected icon or item, typically with a finger, to enter a corresponding instruction to the machine.

A touch panel may be used as a medium for writing characters and pictures on electronic paper. When an icon or item is selected by touching the surface of the touch panel (hereinafter referred to as "touch surface") with a finger, or when characters are written on a blackboard-sized touch screen, the shortest distance between adjacent touch locations that can be identified and detected on the touch panel may be relatively great. However, when the pressure sensitive writing tablet is applied to electronic paper the size of A4, for example, the shortest distance between adjacent touch locations that can be identified and detected should be greatly reduced, and it is necessary to use a writing stylus comparable to a ball-point pen or a mechanical pencil in size.

The following problems arise when inputting characters and lines on a touch panel using such a pen-like writing stylus.

(a) When inputting a line on a touch panel with a writing stylus, the pressure applied to the touch panel by the writing stylus often varies because the touch surface is relatively slippery, which would produce a number of touch locations along the input line where the stylus pressure is below the threshold value for detection, and no touch is recognized at such positions. As a result, touch locations are actually detected at intervals. If the input line is displayed with the detected touch locations only, it would differ significantly from the one that the user intended to input.

(b) When the user holds the writing stylus by hand and presses the tip of the stylus against the touch surface to write characters or lines, a portion of the hand also contacts the touch surface. The touch panel must then distinguish a touch by the writing stylus from a touch by a portion of the hand. However, if the threshold value for detecting a touch on the touch surface is lowered to overcome the problem described in (a) above, useless contact from a portion of the hand having nothing to do with the input line would also be detected as an intended touch, and the line that is actually displayed would not match the input line intended by the user.

(c) Touches and their touch locations are detected based on digital values which are obtained by converting thereto, with an analog/digital converter (ADC), voltages across pressure sensitive resistors wired in a grid form in vertical and horizontal directions of the touch surface. The number of pressure sensitive resistors in the touch surface of, for example, a 12-inch touch panel used for inputting characters may be approximately 100×100. Assuming that a drive voltage for each pressure sensitive resistor is 5 V, the voltage change across the pressure sensitive resistor due to a touch at one touch location is extremely low, that is, approximately 0.0005 V, and the ADC output is extremely low. If the touch sensitivity of the touch panel is increased in order to resolve the above problem (a), the drive voltage must be significantly increased. This significantly increases power consumption of the touch panel.

(d) The touch locations detected by the touch panel may fluctuate, and when the detected touch locations are sequentially connected in the detected order with straight lines, the displayed line may become a crooked line consisting of very small line segments, which is different from the input line intended by the user.

SUMMARY OF THE INVENTION

An object of the present invention is to provide a pressure sensitive writing tablet capable of improving line input with a touch panel, electronic paper provided with the pressure sensitive writing tablet, a method for controlling the pressure sensitive writing tablet, and a program for making a computer execute the method.

Another object of the invention is to provide a pressure sensitive writing tablet that can faithfully display an input line without particularly increasing touch panel sensitivity, electronic paper provided with the pressure sensitive writing tablet, a method for controlling the pressure sensitive writing tablet, and a program for making a computer execute the method.

A further object of the invention is to provide a pressure sensitive writing tablet that can effectively prevent the touch locations from fluctuating, electronic paper provided with the pressure sensitive writing tablet, a method for controlling the pressure sensitive writing tablet, and a program for making a computer execute the method.

A pressure sensitive writing tablet according to a first aspect of the present invention comprises:

a touch panel for generating an output signal corresponding to a touch surface pressure distribution relating to touch locations where a writing stylus touched the touch surface;

means for generating touch data including data on a touch location and a touch time for each touch of the writing stylus to the touch surface by sampling the output signal of the touch panel, determining if there was a touch of the writing stylus to the touch surface based on the sampled data, and, if there was a touch, detecting the touch location and touch time of the touch;

means for determining, based on the touch data, whether each touch of the touch data is a touch on a contiguous line input on the touch panel;

means for generating velocity data by calculating, based on the touch data, a velocity of the writing stylus at each segment of the contiguous line input on the touch surface, the velocity data including data relating to the calculated velocities;

means for determining, based on the velocity data, a type of a line connecting the touch locations of two touches that are on the contiguous line and temporally adjacent to each other in the detection order (herein after referred to as "adjacent touches");

means for producing a line drawing connecting the touch locations of the respective adjacent touches based on the line types determined by the line type determining means; and a display device for displaying the line drawing produced by the line drawing producing means.

The data on the touch locations and touch times included in the touch data may be the touch locations and touch times per se, or relative values for the touch locations and touch times. The relative values for the touch locations may include corrected touch locations used in the fluctuation suppression process described later. The relative values for the touch times may include, for example, the amount of time elapsed from a predetermined reference time which is represented by using a sampling time interval as a unit of measure, or may be sequence numbers assigned to the respective sampling times starting from a predetermined reference sampling time as n=1. The contiguous line input on the touch panel may be, for example, a partial line of a character, a line for drawing, or a line of a picture.

The display is typically a monochrome display. The correspondence between a unit of detection for the touch locations on the touch surface and a pixel on the display does not need to be 1:1. The distribution density of the unit of detection for the touch locations on the touch surface may be greater than or less than the distribution density of pixels on the display. That is, there may be a one-to-plural or plural-to-one correspondence in a partial or whole area between the unit of detection for the touch locations on the touch surface and the pixels on the display. The types of the connecting line determined by the line type determining means may include curves with different curvatures, a single line segment, and a crooked line consisting of plural (two or more) line segments.

The pressure sensitive writing tablet is typically a touch panel integrated with a display, but the touch panel and the display may be separately disposed. If the touch panel and the display are integrated, the touch panel must be transparent so that images on the display can be seen through the touch panel.

The velocity of the writing stylus moving on the touch surface when a contiguous line is input at touch locations is related to the type of the input contiguous line. By determining the type of the line connecting the touch locations associated with adjacent touches based on the velocity of writing stylus movement and displaying a line drawing produced based on the line type determined, a line faithful to the contiguous line input by the user can be displayed even when the touch locations are detected at intervals or with skips along the input contiguous line.

According to the first aspect of this invention, since the detected touches along the input contiguous line may be skipping, that is, it is not necessary to increase the detection sensitivity of the writing stylus for the touch locations in order to distinguish a touch and a non-touch, it is possible to avoid detecting unnecessary touches as a result of increasing the detection sensitivity, and to avoid increasing power consumption as a result of increasing the touch panel drive voltage.

According to the second aspect of the present invention, in the pressure sensitive writing tablet of the first aspect, the display device is disposed at a side opposite to the touch surface of the touch panel.

According to the third aspect of the present invention, in the pressure sensitive writing tablet of the first or second aspect, the line type determining means sets, as a connecting line between two touch locations of adjacent touches, a line having a less curvature when the velocity of the writing stylus between the two touch locations on the touch surface is high than when the velocity is low.

A single line segment has a curvature smaller than that of a curve or a crooked line. The velocity of the writing stylus at a touch position is relatively high when the input contiguous line is a straight or nearly straight line, and is relatively low when the contiguous line is a curve with a large curvature. It is expected that the velocity of the writing stylus on the touch surface is approximately 1.0 m/sec in the case of the straight or nearly straight line, while it is approximately 0.5 m/sec in the case of a general curve though the velocity would become smaller as the curvature becomes larger. It is, therefore, possible to display a line more faithful to the contiguous line input by the user by setting the type of the line connecting the touch locations of two adjacent touches to a line type having a smaller curvature, that is, a line similar to a single line segment, when the writing stylus velocity is high than when the velocity is low.

According to the fourth aspect of the present invention, in the pressure sensitive writing tablet of one of the first to third aspects, when the line type determining means determines that the writing stylus has moved on a curve between the adjacent touches, it defines the following, C(0), C(1): earlier and later adjacent touches, respectively, C(−1): a touch one before C(0), C(2): a touch one after C(1), L1: a line connecting the touch locations of C(−1) and C(0), L2: a line connecting the touch locations of C(1) and C(2), Ra: an intersection of L1 and L2; and sets the line connecting C(0) and C(1) to a line type passing inside the sides of a triangle C(0)-Ra—C(1).

Thus, the line connecting the touch locations for the adjacent touches has a controlled curvature so that a line faithful to the contiguous line input by the user can be displayed.

According to the fifth aspect of the present invention, in the pressure sensitive writing tablet of one of the first to fourth aspects, a time interval for detecting the output signal of the touch panel by the touch data generating means is shorter than the minimum time interval defined as the time required for a user to move the writing stylus by z on the touch panel, where z represents a shortest distance between touch locations which can be identified on the touch panel.

Typical specifications for the pressure sensitive writing tablet are as follow.

Touch surface and display size: 12 inches

Number of detectable touch locations on the touch surface in vertical and horizontal directions: 1000×1000

Number of display pixels in vertical and horizontal directions: 1000×1000

Sampling frequency: 400–800 Hz

Serial data transfer rate from an ADC when the touch panel output is converted from analog to digital by the ADC: 9600–19,200 bps Since the time interval for detecting the output signal of the touch panel by the touch data generating means is shorter than the minimum time interval defined as the time required for the user to move the writing stylus by z on the touch panel, touches having consecutive touch locations can be reliably detected insofar as the touch pressure is equal to or greater than a predetermined threshold value.

A pressure sensitive writing tablet according to the sixth aspect of the present invention comprises:

a touch panel for generating an output signal corresponding to a touch surface pressure distribution relating to touch locations where a writing stylus touched the touch surface;

means for generating primary touch data including data on a primary touch location and a touch time for each touch of the writing stylus to the touch surface by sampling the output signal of the touch panel, determining if there was a touch of the writing stylus to the touch surface based on the sampled data, and, if there was a touch, detecting the touch location and touch time of that touch;

means for determining, based on the primary touch data, whether each touch of the primary touch data is a touch on a contiguous line input on the touch panel;

means for generating secondary touch data including data on a secondary touch location for each touch by computing the secondary touch location which is obtained from correcting, by a predetermined correction process, a primary touch location of a touch included in the primary touch data and located on the contiguous line (hereinafter referred to as "target touch") based on primary touch locations of multiple touches (hereinafter referred to as "correcting touches") having the respective touch times within a predetermined time range Ta including the touch time of the target touch;

means for producing a line drawing connecting with a selected line the secondary touch locations of two touches that are on the contiguous line and temporally adjacent to each other in the detection order (hereinafter referred to as "adjacent touches"); and a display device for displaying the line drawing produced by the line drawing producing means.

The correcting touches are limited to those within the predetermined time range Ta from the touch time of the target touch. Representing the touch time of the target touch by to, and defining a predetermined value DT, then Ta may be to $-\Delta T \leq Ta \leq $ to$+\Delta T$; or to $-\Delta T \leq Ta \leq $ to; or to $\leq Ta \leq $ to$+\Delta T$.

Since a touch location for a touch with a touch time far from the touch time of the target touch has little effect on the touch time of the target touch, it is advantageous to limit the correcting touches to those within the predetermined time range Ta.

Since the writing stylus often slips on the touch surface, touches on the touch surface by the writing stylus may wander or fluctuate. If the line drawing is produced and displayed based on the primary touch locations subject to such fluctuation, the displayed line would deviate from the line intended by the user. Therefore, the secondary touch locations are generated by the correction process for suppressing such fluctuation, and the line drawing is produced and displayed based on these secondary touch locations. As a result, deviation from the intended line, or fluctuation, can be suppressed in the displayed line, that is, the displayed line is faithful to the line intended by the user.

According to the seventh aspect of the present invention, in the pressure sensitive writing tablet of the sixth aspect, the correcting touches used in the correction process are touches at primary touch locations in a predetermined area Ao containing the primary touch location of the target touch.

The predetermined area Ao may be, for example, a circle having a predetermined radius or a square having a predetermined side length, centered on the primary touch location of the target touch.

Change in touch locations due to the fluctuation is relatively small. If the change is large, it is considered that the change has occurred due to an intentional movement of the writing stylus rather than the fluctuation. Therefore, by limiting the correcting touches to the primary touch locations within the predetermined area Ao, secondary touch locations appropriate for use in suppressing the fluctuation can be calculated.

According to the eighth aspect of the present invention, in the pressure sensitive writing tablet of the sixth or seventh aspect, the correction process counts for each primary touch location the number of correcting touches having the same primary touch location, and selects a primary touch location having the highest count as a secondary touch location for the target touch.

Touches due to the fluctuation are exceptional or infrequent, and most touches are presumed to be the ones which are not affected by the fluctuation. Therefore, by setting the secondary touch location for the target touch to the primary touch location having the maximum number of correcting touches, the fluctuation has no or little influence on the secondary touch location for the target touch.

According to the ninth aspect of the present invention, in the pressure sensitive writing tablet of the eighth aspect, the correction process computes an average position of the primary touch locations of the correcting touches, and selects this average position as the secondary touch location for the target touch if there is no primary touch location having the highest count.

There may be a case in which a primary touch location having the maximum number of correcting touches sharing the same primary touch location is not found because the secondary touch locations of the correcting touches are dispersed. In such a case, the fluctuation can be appropriately suppressed by using the average position of the secondary touch locations of the correcting touches as the secondary touch location for the target touch.

According to the tenth aspect of the present invention, the pressure sensitive writing tablet of one the sixth to ninth aspects further comprises:

means for generating velocity data by calculating, based on the touch data, a velocity of the writing stylus at each segment of the contiguous line input on the touch surface, the velocity data including data relating to the calculated velocities; and means for determining, based on the velocity data, a type of a line connecting the secondary touch locations of the adjacent touches.

Thus, by displaying a line drawing produced based on the secondary touch locations calculated by the correction process, a line closer to the input continuous line intended by the user can be displayed.

According to the eleventh aspect of the present invention, in the pressure sensitive writing tablet of one of the sixth to tenth aspects, the display device is provided at a side opposite to the touch surface of the touch panel.

According to the twelfth aspect of the present invention, in the pressure sensitive writing tablet of one of the sixth to eleventh aspects, the line type determining means sets, as a connecting line between two touch locations of adjacent touches, a line having a less curvature when the velocity of the writing stylus between the two touch locations on the touch surface is high than when the velocity is low.

According to the thirteenth aspect of the present invention, in the pressure sensitive writing tablet of one of the sixth to twelfth aspects, when the line type determining means determines that the writing stylus has moved on a curve between the adjacent touches, it defines the following:

C(0), C(1): earlier and later writing stylus touches, respectively,

C(−1): a touch one before C(0),

C(2): a touch one after C(1),

L1: a line connecting the touch locations of C(−1) and C(0),

L2: a line connecting the touch locations of C(1) and C(2),

Ra: an intersection of L1 and L2.

The line type determining means then sets the line connecting C(0) and C(1) to a line type passing inside the sides of a triangle C(0)-Ra—C(1).

According to the fourteenth aspect of the present invention, in the pressure sensitive writing tablet of one of the sixth to thirteenth aspects, a time interval for detecting the output signal of the touch panel by the touch data generating means is shorter than the minimum time interval defined as the time required for a user to move the writing stylus by z on the touch panel, where z represents a shortest distance between touch locations which can be identified on the touch panel.

Electronic paper according to the fifteenth aspect of the present invention comprises the pressure sensitive writing tablet of one of the first to fourteenth aspects. The electronic paper may be defined as being substantially identical in appearance and handling to conventional paper, except that lines and characters are written using the pressure from a pen point instead of ink.

A method for controlling a pressure sensitive writing tablet according to the sixteenth aspect of the present invention comprises the steps of:

generating an output signal corresponding to a touch surface pressure distribution relating to touch locations where a writing stylus touched the touch surface;

generating touch data including a touch location and a touch time for each touch of the writing stylus to the touch surface by sampling the output signal generated by the output signal generating step, determining if there was a touch of the writing stylus to the touch surface based on the sampled data, and, if there was a touch, detecting the touch location and touch time of the touch;

determining, based on the touch data, whether each touch of the touch data is a touch on a contiguous line input on the touch panel;

generating velocity data by calculating, based on the touch data, a velocity of the writing stylus at each segment of the contiguous line input on the touch surface, the velocity data including data relating to the calculated velocities;

determining, based on the velocity data, a type of a line connecting the touch locations of two touches that are on the contiguous line and temporally adjacent to each other in the detection order (hereinafter referred to as "adjacent touches");

producing a line drawing connecting the touch locations of the respective adjacent touches based on the line types determined by the line type determining step; and displaying the line drawing produced by the line drawing producing step.

According to the seventeenth aspect of the present invention, in the method for controlling a pressure sensitive writing tablet of the sixteenth aspect, the displaying step preferably displays at the back of the touch panel.

According to the eighteenth aspect of the present invention, in the method for controlling a pressure sensitive writing tablet of the sixteenth or seventeenth aspect, the line type determining step sets, as a connecting line between two touch locations of adjacent touches, a line having a less curvature when the velocity of the writing stylus between the two touch locations on the touch surface is high than when the velocity is low.

According to the nineteenth aspect of the present invention, in the method for controlling a pressure sensitive writing tablet of one of the sixteenth to eighteenth aspects, when the line type determining step determines that the writing stylus has moved on a curve between the adjacent touches, it defines the following:

C(0), C(1): earlier and later adjacent touches, respectively,

C(−1): a touch one before C(0),

C(2): a touch one after C(1),

L1: a line connecting the touch locations of C(−1) and C(0),

L2: a line connecting the touch locations of C(1) and C(2),

Ra: an intersection of L1 and L2.

The line type determining step then sets the line connecting C(0) and C(1) to a line type passing inside the sides of a triangle C(0)-Ra—C(1).

According to the twentieth aspect of the present invention, in the method for controlling a pressure sensitive writing tablet of one of the sixteenth to nineteenth aspects, a time interval for detecting the output signal of the touch panel by the touch data generating step is shorter than the minimum time interval defined as the time required for a user to move the writing stylus by z on the touch panel, where z represents a shortest distance between touch locations which can be identified on the touch panel.

A method for controlling a pressure sensitive writing tablet according to the twenty-first aspect of the present invention comprises the steps of:

generating an output signal corresponding to a touch surface pressure distribution relating to touch locations where a writing stylus touched a touch surface of a touch panel;

generating primary touch data including data on a primary touch location and a touch time for each touch of the writing stylus to the touch surface by sampling the output signal of the touch panel, determining if there was a touch of the writing stylus to the touch surface based on the sampled data, and, if there was a touch, detecting the touch location and touch time of that touch;

determining, based on the primary touch data, whether each touch of the primary touch data is a touch on a contiguous line input on the touch panel;

generating secondary touch data including data on a secondary touch location for each touch by computing the secondary touch location which is obtained from correcting, by a predetermined correction process, a primary touch location of a touch included in the primary touch data and located on the contiguous line (hereinafter referred to as "target touch") based on primary touch locations of multiple touches (hereinafter referred to as "correcting touches") having the respective touch times within a predetermined time range Ta including the touch time of the target touch;

producing a line drawing connecting with a selected line the secondary touch locations of two touches that are on the contiguous line and temporally adjacent to each other in the detection order (hereinafter referred to as "adjacent touches"); and displaying the line drawing produced by the line drawing producing step.

According to the twenty-second aspect of the present invention, in the method for controlling a pressure sensitive writing tablet of the twenty-first aspect, the correcting touches of the correction process are preferably touches with a primary touch location in a predetermined area Ao containing the primary touch location of the target touch.

According to the twenty-third aspect of the present invention, in the method for controlling a pressure sensitive writing tablet of the twenty-first or twenty-second aspect, the correction process counts for each primary touch location the number of correcting touches having the same primary touch location, and selects a primary touch location having the highest count as a secondary touch location for the target touch.

According to the twenty-fourth aspect of the present invention, in the method for controlling a pressure sensitive writing tablet of the twenty-third aspect, the correction process computes an average position of the primary touch locations of the correcting touches, and selects this average position as the secondary touch location for the target touch when there is no primary touch location having the highest count.

According to the twenty-fifth aspect of the present invention, the method for controlling a pressure sensitive writing tablet of one of the twenty-first to twenty-fourth aspects further comprises the steps of:

generating velocity data by calculating, based on the touch data, a velocity of the writing stylus at each segment of the contiguous line input on the touch surface, the velocity data including data relating to the calculated velocities; and determining, based on the velocity data, a type of a line connecting the secondary touch locations of the adjacent touches.

According to the twenty-sixth aspect of the present invention, in the method for controlling a pressure sensitive writing tablet of one of the twenty-first to twenty-fifth aspects, the displaying step displays at the back of the touch panel.

According to the twenty-seventh aspect of the present invention, in the method for controlling a pressure sensitive writing tablet of the twenty-fifth aspect, the line type determining step sets, as a connecting line between two touch locations of adjacent touches, a line having a less curvature when the velocity of the writing stylus between the two touch locations on the touch surface is high than when the velocity is low.

According to the twenty-eighth aspect of the present invention, in the method for controlling a pressure sensitive writing tablet of the twenty-seventh aspect, when the line type determining step determines that the writing stylus has moved on a curve between the adjacent touches, it defines the following:

C(0), C(1): earlier and later writing stylus touches, respectively,

C(−1): a touch one before C(0),

C(2): a touch one after C(1),

L1: a line connecting the touch locations of C(−1) and C(0),

L2: a line connecting the touch locations of C(1) and C(2),

Ra: an intersection of L1 and L2.

The line type determining step then sets the line connecting C(0) and C(1) to a line type passing inside the sides of a triangle C(0)-Ra—C(1).

According to the twenty-ninth aspect of the present invention, in the method for controlling a pressure sensitive writing tablet of one of the twenty-first to twenty-eighth aspects, a time interval for detecting the output signal of said touch panel by said touch data generating means is shorter than the minimum time interval defined as the time required for a user to move the writing stylus by z on said touch panel, where z represents a shortest distance between touch locations which can be identified on said touch panel.

A control program for a pressure sensitive writing tablet according to the present invention makes a computer execute the steps of the method for controlling the pressure sensitive writing tablet of one of the sixteenth to twenty-ninth aspects.

DETAILED DESCRIPTION OF THE INVENTION

The preferred embodiments of the present invention are described below with reference to the accompanying figures.

Figure 1:
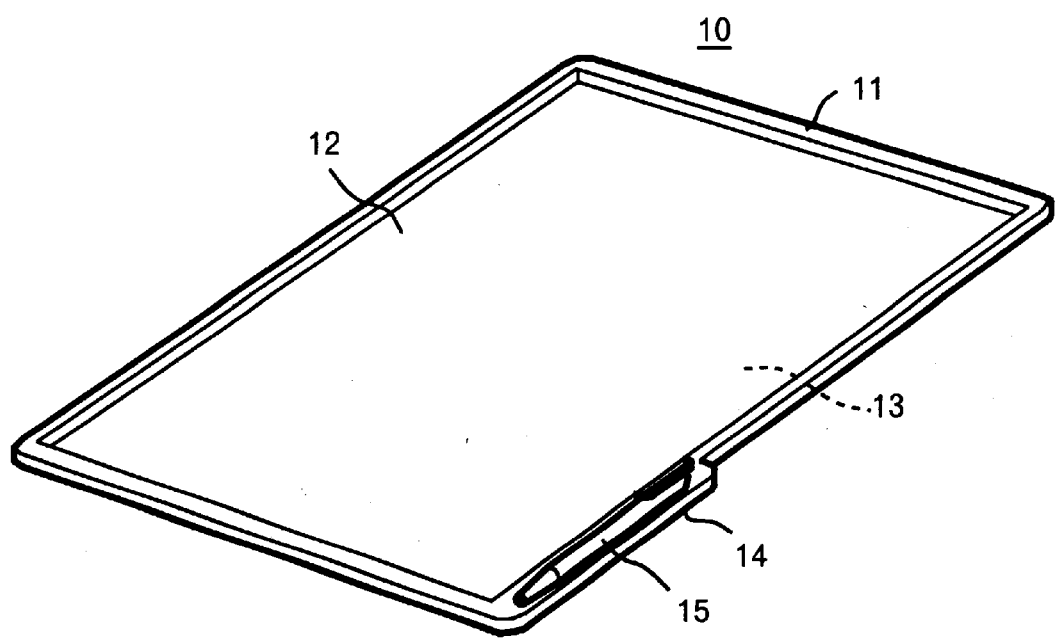
FIG. 1 is an oblique view of the pressure sensitive writing tablet according to a preferred embodiment of the present invention.

FIG. 1 is an oblique view of a pressure sensitive writing tablet 10. This pressure sensitive writing tablet 10 includes a liquid crystal display (LCD) 13 overlaid with a touch panel 12, each having approximately the same size and shape as a sheet of A4 paper, and a housing 11 which surrounds the edges of the touch panel 12 and LCD 13, and covers the bottom of the LCD 13. The touch panel 12 is colorless, transparent, and pressure sensitive. The LCD 13 is monochrome. A stylus holder 14 protrudes from the right edge of the LCD 13, and holds a writing stylus 15 in a recess formed on the top surface of the stylus holder 14. The writing stylus 15, which can be freely picked up from the stylus holder 14, has a pressure tip at one end thereof which has approximately the same diameter as a pen point of a conventional ball-point pen. The writing stylus 15 does not release ink from the tip when it touches on the touch panel 12, but simply presses on the touch panel 12 by the tip. To input one or more lines of a character or a picture to the pressure sensitive writing tablet 10, a user picks up from the stylus holder 14 and grips the writing stylus 15, and moves the tip of the stylus 15 on the surface of the touch panel 12 while pressing down to apply pressure.

Figure 2:
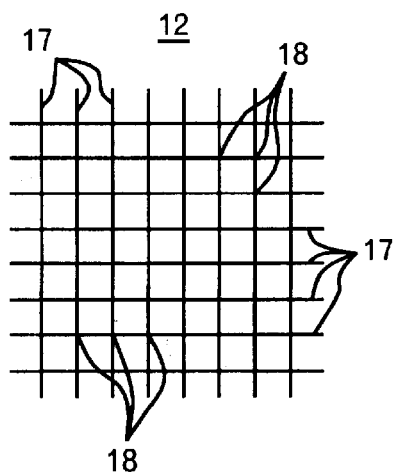
FIG. 2 shows the distribution of touch detecting positions in the touch panel according to a preferred embodiment of the present invention.

FIG. 2 shows the distribution of touch detecting positions 18 on the touch panel 12. Straight pressure sensitive resistance lines 17 are arranged in vertical and horizontal directions to form a grid in the touch panel 12. Intersections between the vertical and horizontal resistance lines 17 form the touch detecting positions 18. In a typical touch panel 12, the distance between adjacent touch detecting positions 18 in the vertical and horizontal directions is approximately 0.1 mm, for example. When the tip of the writing stylus 15 is pressed against the touch panel 12, the resistance of the pressure sensitive resistance line 17 wired directly below the tip or adjacent thereto changes. This makes it possible to determine where the writing stylus 15 touched the touch panel 12 by identifying the vertical and horizontal pressure sensitive resistance lines 17 where the resistance changed. In this way, the vertical and horizontal pressure sensitive resistance lines 17 where the resistance changed are determined at each sampling time to detect the touch location of the writing stylus 15 on the touch panel 12. As noted above, when the user grips the writing stylus 15 and moves the tip of the writing stylus 15 on the touch panel 12 while pressing the tip of the writing stylus 15 against the touch panel 12, a portion of the user's hand may contact the touch panel 12. The pressure sensitive writing tablet 10 must be able to distinguish between the touch for the input line by the writing stylus 15 and other touches, and the reference (threshold) pressure above which existence of a touch is assured, therefore, should not be set very low. Furthermore, the surface of the touch panel 12 is slippery. For these reasons, some touches along the input line may have the touch pressure below the reference pressure, so that the pressure sensitive writing tablet 10 detects touch locations for valid touches at intervals. Also, since the touch panel 12 is slippery, the fluctuation may occur in which the writing stylus slides to either side of the input line intended by the user. Therefore, if a line drawing connecting the detected touch locations in the detection order with line segments is displayed as it is, the displayed line (including a portion of a character) would differ greatly from the line that the user intended to input.

Figure 3:
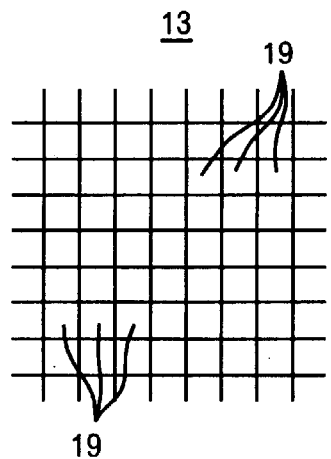
FIG. 3 shows the pixel arrangement of the LCD, according to a preferred embodiment of the present invention.

FIG. 3 shows the arrangement of pixels 19 in the LCD 13. A lot of pixels 19 are arranged contiguously at regular intervals in vertical and horizontal directions in the LCD 13, and display either black or white depending on control signals. The density of touch detecting positions 18 on the touch panel 12 and the density of pixels 19 on the LCD 13 do not need to precisely match, that is, the touch detecting positions 18 on the touch panel 12 and the pixels 19 on the LCD 13 do not need to have a 1:1 correspondence therebetween. There may be a one-to-plural or plural-to-one correspondence between some or all of the touch detecting positions 18 and pixels 19.

Figure 4:
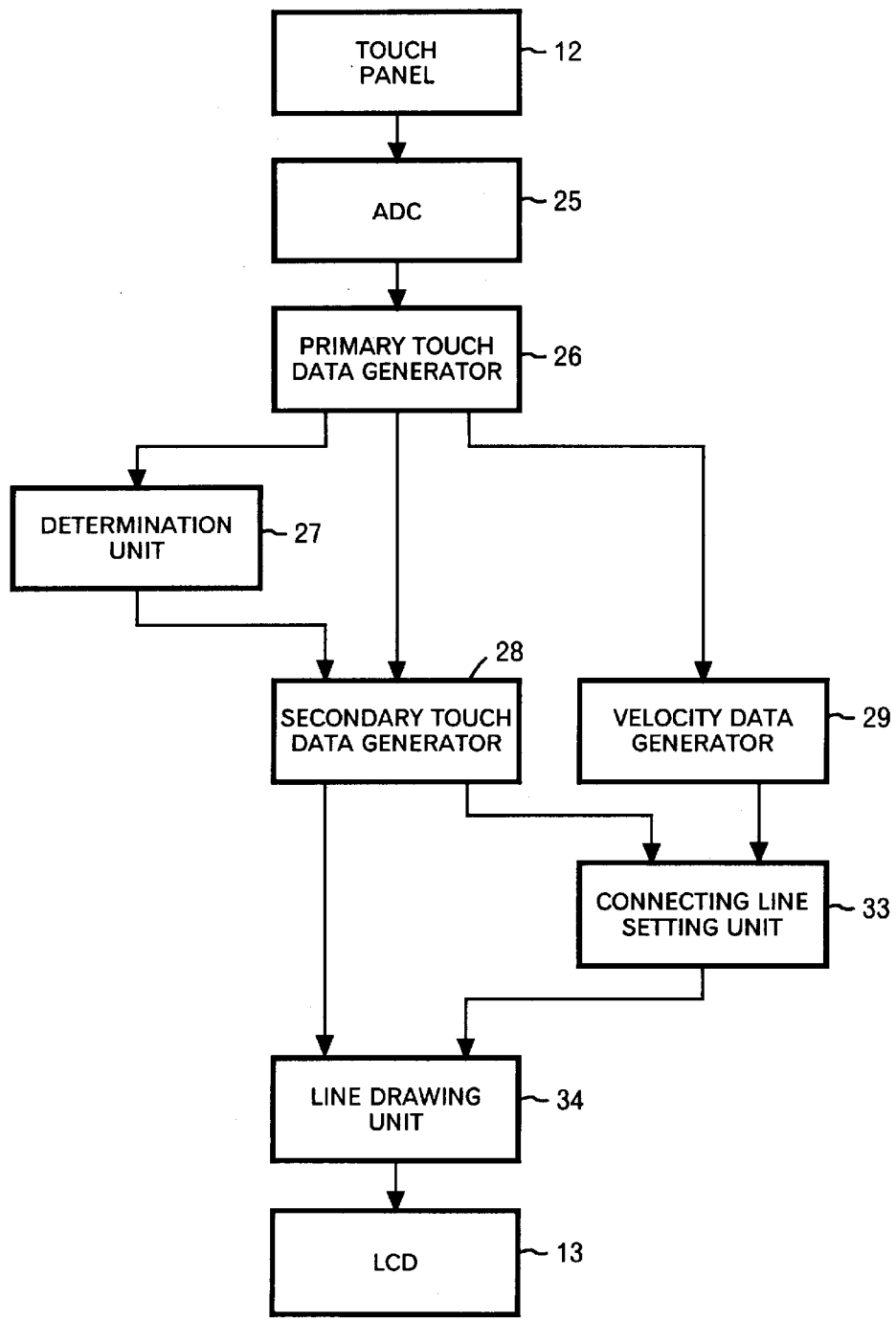
FIG. 4 is a block diagram of the pressure sensitive writing tablet, according to a preferred embodiment of the present invention.

FIG. 4 is a block diagram of the pressure sensitive writing tablet 10. An analog-to-digital converter (ADC) 25 scans, in a predetermined order, the analog output voltages of the vertical and horizontal resistance lines 17 arranged in a grid form in the touch panel 12, and converts each analog output voltage to a digital value. A primary touch data generator 26 compares the output of the ADC 25 with a predetermined reference value (threshold value) to detect whether there is a touch on the touch panel 12 and detect its touch time if there is a touch. The primary touch data generator 26 then generates primary touch data, which includes data on touch locations for the detected touches (hereinafter referred to as "primary touch location") and their touch times. A determination unit 27 determines whether a touch to be determined in the primary touch data is a touch on the continuous line input on the touch panel 12 by the user. For example, if a time interval between the touch time of the touch to be determined and the touch time of the touch detected immediately before the touch to be determined is equal to or greater than a predetermined interval, that is, if sufficient time has passed between the touch time of the touch to be determined and the touch time of the last touch, it can be determined that the touch to be determined is not the one on the contiguous line. A secondary touch data generator 28 corrects the primary touch locations on the contiguous line to suppress the fluctuation, and generates secondary touch data including data on the corrected touch locations (hereinafter referred to as "secondary touch location").

Figure 8:
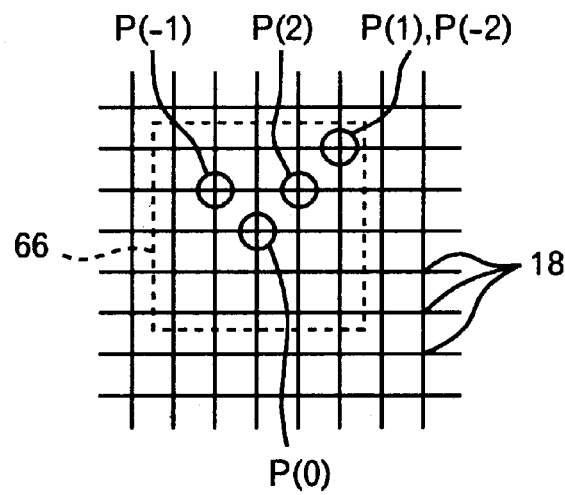
FIG. 8 describes a process for calculating a secondary touch location of a touch to be corrected, according to a preferred embodiment of the present invention.

FIG. 8 is a schematic view for explaining a process for computing a secondary touch location of a touch to be corrected. P(0) in FIG. 8 is a primary touch location of the touch to be corrected. The primary touch data is searched for touches (hereinafter referred to as "correcting touches") meeting the following conditions (a) and (b) relative to the touch to be corrected.

(a) Its touch time falls within a time range to ±DT where to is a time when the touch to be corrected was detected.

(b) Its primary touch location exists within a square area 66 having a predetermined size and centering around the touch to be corrected.

In the example shown in FIG. 8, there are five correcting touches with the respective touch locations P(−2), P(−1), P(0), P(1), and P(2) which are ordered in time sequence starting from the correcting touch with the earliest touch time. Note that the correcting touch at the primary touch location P(0) is also the touch to be corrected. The above condition (a) may be replaced by a different condition (a1) in which the touch time falls within a time range between to —DT and to or between to and to +DT where to is a touch time of the touch to be corrected. Similarly, the condition (b) may be replaced by a different condition (b1) in which the primary touch location exists within a circle having a predetermined radius r and centering around the primary touch location of the touch to be corrected.

The number of correcting touches having the same primary touch location is counted, and a primary touch location having the maximum number of correcting touches is used as a secondary touch location of the touch to be corrected. In the example shown in FIG. 8, the maximum number of correcting touches having the same primary touch location is two, and that primary touch location is at P(−2) and P(1). Therefore, the position at P(−2) and P(1) is defined as a secondary touch location of the touch to be corrected at P(0). When the user is moving the writing stylus 15 to input a line on the touch panel 12, points where the tip of the writing stylus 15 touches the touch panel 12 may be made unsteady due to, for example, the slipperiness of the touch panel 12, which may lead to the fluctuation of touches on the touch panel 12. When particular touches, which are temporally and spatially close to the touch to be corrected, are extracted as correcting touches from the primary touch data, correcting touches that varied due to the fluctuation would belong to the minority while other correcting touches that did not vary would belong to the majority. Thus, each touch to be corrected can be assigned a secondary touch location having no or suppressed fluctuation by defining, as the secondary touch location of the touch to be corrected, the primary touch location having the maximum number of correcting touches.

Returning to FIG. 4, a velocity data generator 29 calculates the velocity of the writing stylus 15 at each segment along the input contiguous line based on the primary touch data. If the secondary touch data also includes data on a touch time in addition to the secondary touch location for each touch, the velocity data generator 29 can compute the velocity of the writing stylus 15 at each segment along the input contiguous line based on the secondary touch data instead of the primary touch data. The velocity v of the writing stylus 15 at each segment along the input contiguous line can be calculated by dividing the distance between the secondary touch locations of two touches adjacent to each other in the detection order by the difference between the respective touch times. A connecting line setting unit 33 determines the type of a line connecting secondary touch locations of touches adjacent to each other in the detection order based on the velocity between these two touches. In general, the velocity of the writing stylus 15 on the touch panel 12 is slower when drawing a curve than when drawing a straight line. Therefore, if the velocity between adjacent touches is determined to be equal to or greater than a predetermined value, a connecting line between those adjacent secondary touch locations is set as a straight line segment, assuming that the writing stylus 15 has moved straight between the adjacent secondary touch locations. On the other hand, if the velocity between adjacent touches is determined to be less than the predetermined value, the connecting line between the adjacent secondary touch locations is set as a crooked line as shown in FIG. 9 and further described below, assuming that the writing stylus 15 has moved along a curved line.

Figure 9:
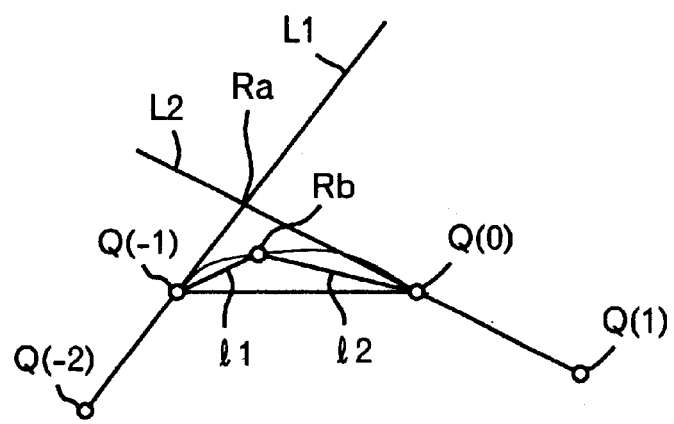
FIG. 9 describes a process for setting a crooked line connecting adjacent secondary touch locations, according to a preferred embodiment of the present invention.

FIG. 9 illustrates the principle for setting a crooked line connecting adjacent secondary touch locations. In FIG. 9, the secondary touch locations of adjacent touches for which a connecting line is to be set are Q(−1) and Q(0). The order of touches in FIG. 9 is Q(−2), Q(−1), Q(0), Q(1) in time sequence starting from the touch at the earliest detection time. These touches are detected continuously in sequence and not skipped. Straight lines and points shown in FIG. 9 are defined as follows:

L1: a line connecting Q(−2) and Q(−1)

L2: a line connecting Q(0) and Q(1)

Ra: an intersection of L1 and L2

11: a bisector of ∠RaQ(−1)Q(0)

12: a bisector of ∠RaQ(0)Q(−1)

Rb: an intersection of 11 and 12

In order to connect the adjacent secondary touch locations Q(−1) and Q(0) with a crooked line, an intersection Rb is first obtained, and then a crooked line Q(−1)-RB—Q(0) is set as a line connecting between Q(−1)–Q(0). It should be noted that while Q(−2)–Q(−1) and Q(0)–Q(1) are connected with straight lines L1 and L2 in FIG. 9, respectively, this does not mean that the connecting lines between Q(−2)–Q(−1) and between Q(0)–Q(1) are set as straight line segments. Lines L1 and L2 are merely illustrated as auxiliary lines for calculating the crooked line connecting between Q(−1)–Q(0). Connecting lines between Q(−2)–Q(−1) and between Q(0)–Q(1) are set by the same process as that for setting the connecting line between Q(−1)–Q(0), based on velocities of the writing stylus 15 between these adjacent secondary touch locations and straight lines between these locations and their adjacent touch locations preceding and succeeding thereto, respectively.

Returning to FIG. 4, a line drawing unit 34 produces a line drawing connecting the adjacent secondary touch locations extracted by the secondary touch data generator 28 with the line types determined by the connecting line setting unit 33. The line drawing produced by the line drawing unit 34 is then displayed on the LCD 13.

Figure 5:
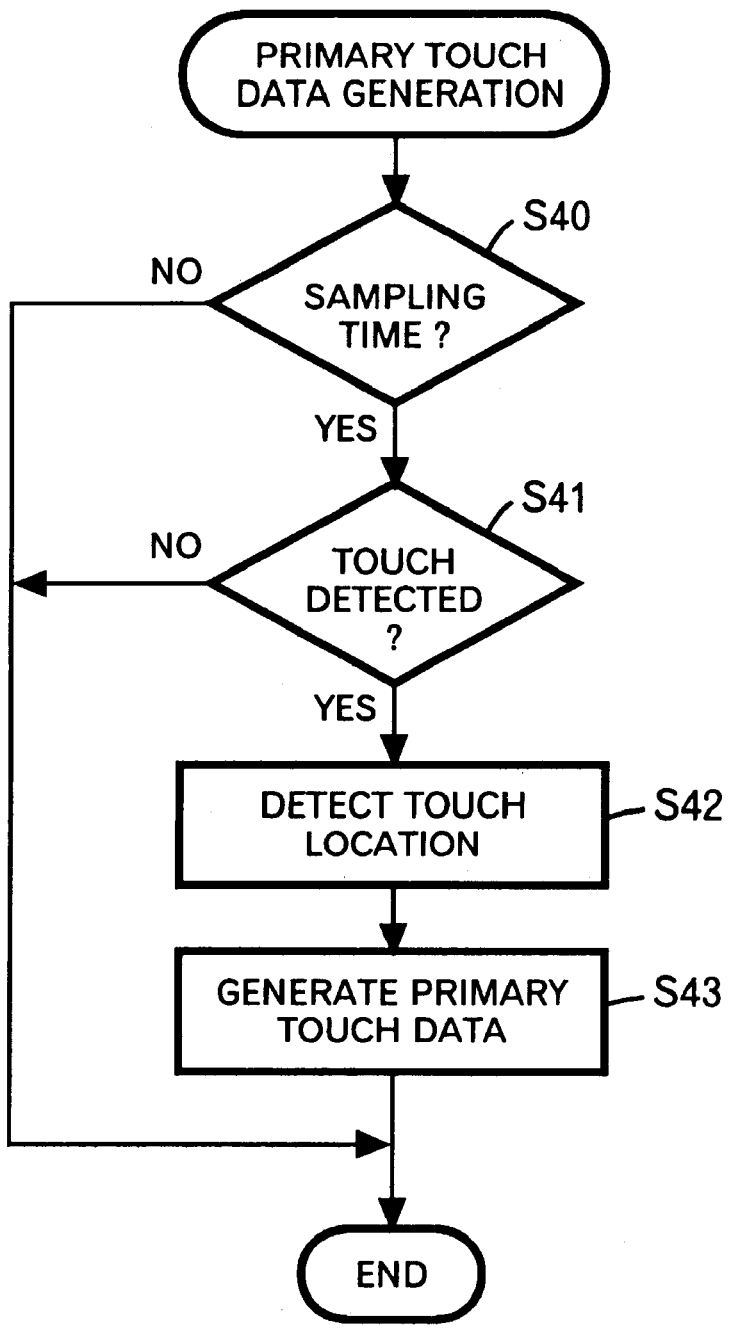
FIG. 5 is a flow chart of a routine for generating the primary touch data, according to a preferred embodiment of the present invention.

FIG. 5 is a flow chart of the primary touch data generating routine. This routine runs each time the current time equals the sampling time. In step S40, it is determined whether the current time equals the sampling time, and the routine advances to step S41 if YES. Otherwise, the routine ends. In step S41, it is determined whether there was a touch on the touch panel 12, and the routine advances to step S42 if YES. Otherwise, the routine ends. The pressure sensitive writing tablet 10 detects a touch when pressure equal to or greater than a predetermined threshold value is applied to any of the detectable positions distributed in a grid pattern. In step S42, the location of the touch detected in S41 is determined. In step S42, primary touch data is generated which includes data on a primary touch location at each sampling time in which the primary touch location is the one detected in S42.

Figure 6:
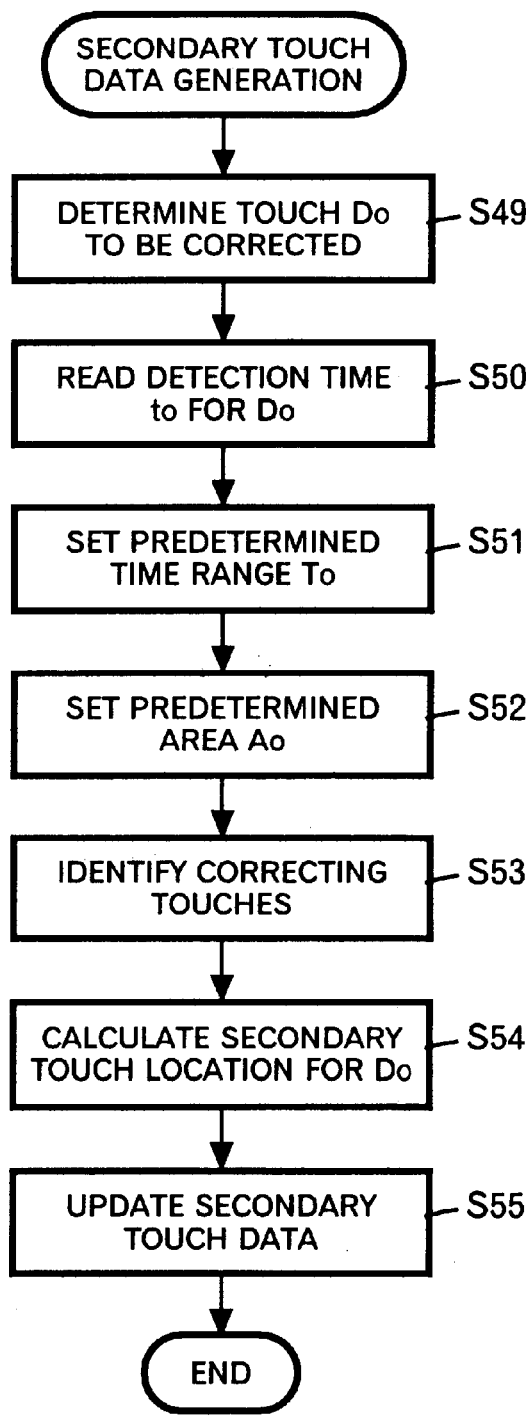
FIG. 6 is a flow chart of a routine for generating the secondary touch data, according to a preferred embodiment of the present invention.

FIG. 6 is a flow chart of the secondary touch data generating routine. This routine runs at a regular interval or whenever the primary touch data generated in step S43 of FIG. 5 is updated. In step S49, a touch Do to be corrected (for which a secondary touch location is to be calculated) is determined. In step S50, a detection time "to" of the touch Do is read from the primary touch data. In step S51, a time range Ta from to −ΔT to to +ΔT is set. In step S52, a primary touch location Poa of the touch Do is read from the primary touch data, and an area Aa centered on the read primary touch location Poa is set. This area Aa is the square area 66 in FIG. 8, for example. In step S53, all correcting touches having primary touch locations in the area Aa and detection times within the time range Ta, and their primary touch locations are read from the primary touch data. In step S54, a secondary touch location for the touch Do is computed based on the primary touch locations read in S53. This secondary touch location is calculated for the touch Do using the method described above with reference to FIG. 8. In step S55, the secondary touch data is updated based on the secondary touch location for the touch Do calculated in S54.

Figure 7:
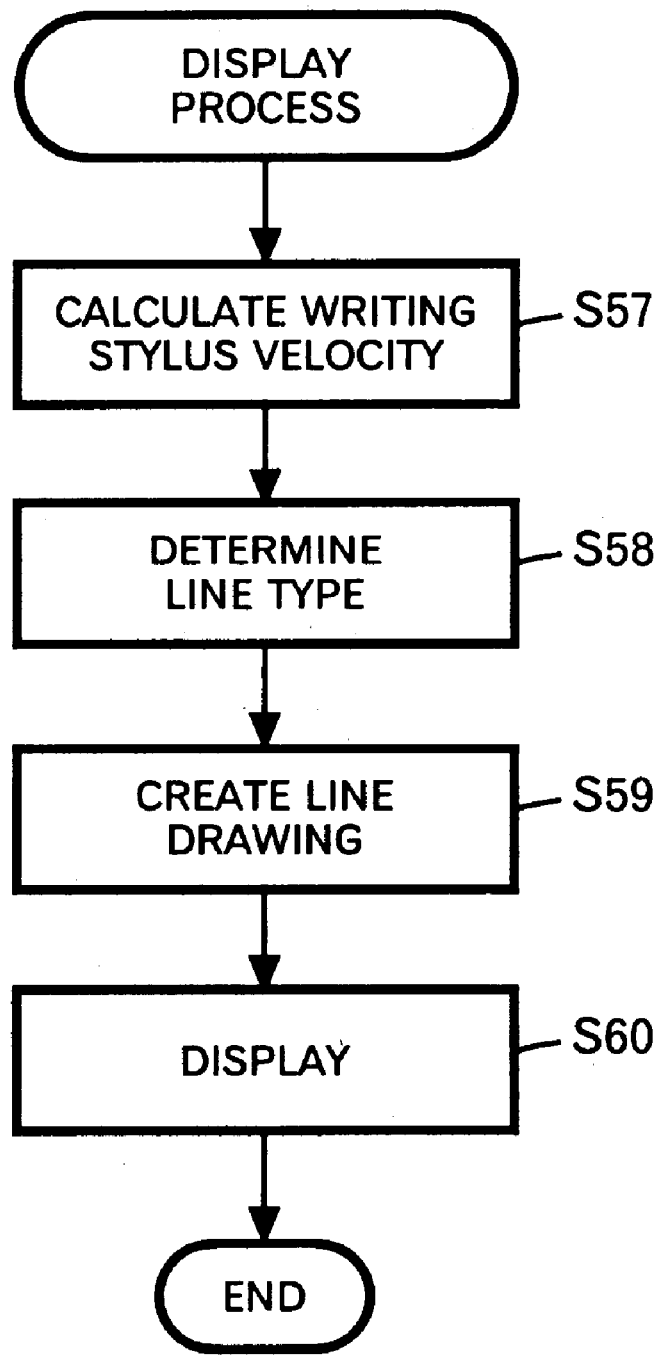
FIG. 7 is a flow chart of a display control routine for the LCD, according to a preferred embodiment of the present invention.

FIG. 7 is a flow chart of the display control routine for the LCD 13. This routine runs at a regular interval or whenever the secondary touch data is updated, and is a display control routine of the LCD 13. In step S57, the velocity of the writing stylus 15 between temporally adjacent touches (that is, temporally adjacent to each other in the detection order) for which a connecting line is to be set (herein also referred to as "adjacent touches to be processed") is calculated. In step S58, a connecting line between the adjacent touches to be processed is set based on the velocity calculated in S57. As described above with reference to FIG. 9, if the writing stylus velocity between the adjacent touches to be processed is equal to or greater than a predetermined threshold value, the connecting line for the adjacent touches to be processed is a single line segment, and if the writing stylus velocity is less than the threshold value, the connecting line for the adjacent touches to be processed is a crooked line consisting of two line segments whose join projects outward in the direction of the curvature of writing stylus movement. In step S59, a line drawing connecting the secondary touch locations of the adjacent touches is created in accordance with the line types determined in S58. In step S60, the line drawing created in S59 is displayed on the LCD 13.

What is claimed is:

1. A pressure sensitive writing tablet comprising:

a touch panel for generating an output signal corresponding to a touch surface pressure distribution relating to touch locations where a writing stylus touched the touch surface;

means for generating touch data including data on a touch location and a touch time for each touch of said writing stylus to said touch surface by sampling the output signal of said touch panel, determining if there was a touch of said writing stylus to said touch surface based on the sampled data, and, if there was a touch, detecting the touch location and touch time of said touch;

means for determining, based on said touch data, whether each touch of said touch data is a touch on a contiguous line input on said touch panel;

means for generating velocity data by calculating, based on said touch data, a velocity of said writing stylus at each segment of the contiguous line input on said touch surface, said velocity data including data relating to the calculated velocities;

means for determining, based on said velocity data, a type of a line connecting the touch locations of two touches that are on the contiguous line and temporally adjacent to each other in the detection order defined as adjacent touches, wherein said line type determining means sets, as a connecting line between two touch locations of adjacent touches, a line having a less curvature when the velocity of said writing stylus between said two touch locations on said touch surface is high than when the velocity is low;

means for producing a line drawing connecting the touch locations of the respective adjacent touches based on the line types determined by said line type determining means; and a display device for displaying the line drawing produced by said line drawing producing means.

2. The tablet of claim 1, wherein said display device is provided at a side opposite to said touch surface of said touch panel.

3. The tablet of claim 1, wherein when said line type determining means determines that said writing stylus has moved on a curve between the adjacent touches, it defines the following, C(0), C(1): earlier and later adjacent touches, respectively, C(−1): a touch one before C(0), C(2): a touch one after C(1), L1: a line connecting the touch locations of C(−1) and C(0), L2: a line connecting the touch locations of C(1) and C(2), Ra: an intersection of L1 and L2; and sets the line connecting C(0) and C(1) to a line type passing inside the sides of a triangle C(0)-Ra—C(1).

4. The tablet of claim 1, wherein a time interval for detecting the output signal of said touch panel by said touch data generating means is shorter than the minimum time interval defined as the time required for a user to move the writing stylus by z on said touch panel, where z represents a shortest distance between touch locations which can be identified on said touch panel.

5. Electronic paper comprising a pressure sensitive writing tablet of claim 1.

6. A pressure sensitive writing tablet comprising:

a touch panel for generating an output signal corresponding to a touch surface pressure distribution relating to touch locations where a writing stylus touched the touch surface;

means for generating primary touch data including data on a primary touch location and a touch time for each touch of said writing stylus to said touch surface by sampling the output signal of said touch panel, determining if there was a touch of said writing stylus to said touch surface based on the sampled data, and, if there was a touch, detecting the touch location and touch time of said touch;

means for determining, based on said primary touch data, whether each touch of said primary touch data is a touch on a contiguous line input on said touch panel;

means for generating secondary touch data including data on a secondary touch location for each touch by computing the secondary touch location which is obtained from correcting, by a predetermined correction process, a primary touch location of a touch included in said primary touch data and located on the target touch contiguous line and defined as a target touch, based on primary touch locations of multiple touches defined as correcting touches herein having the respective touch times within a predetermined time range Ta including the touch time of said target touch;

means for producing a line drawing connecting with a selected line the secondary touch locations of two touches that are on the contiguous line and temporally adjacent to each other in the detection order defined as adjacent touches; and, a display device for displaying the line drawing produced by said line drawing producing means.

7. The tablet of claim 6, wherein said correcting touches in said correction process are touches at primary touch locations in a predetermined area Ao containing the primary touch location of said target touch.

8. The tablet of claim 7, wherein said correction process counts for each primary touch location the number of correcting touches having the same primary touch location, and selects a primary touch location having the highest count as a secondary touch location for the target touch.

9. The tablet of claim 8, wherein said correction process computes an average position of the primary touch locations of the correcting touches, and selects this average position as the secondary touch location for said target touch if there is no primary touch location having the highest count.

10. The tablet of claim 6, wherein a time interval for detecting the output signal of said touch panel by said touch data generating means is shorter than the minimum time interval defined as the time required for a user to move the writing stylus by z on said touch panel, where z represents a shortest distance between touch locations which can be identified on said touch panel.

11. The tablet of claim 6, wherein said display device is provided at a side opposite to said touch surface of said touch panel.

12. Electronic paper comprising a pressure sensitive writing tablet of claim 6.

13. The tablet of claim 6, further comprising:

means for generating velocity data by calculating, based on said touch data, a velocity of said writing stylus at each segment of the contiguous line input on said touch surface, said velocity data including data relating to the calculated velocities; and means for determining, based on said velocity data, a type of a line connecting the secondary touch locations of the adjacent touches.

14. The tablet of claim 13, wherein said line type determining means sets, as a connecting line between two touch locations of adjacent touches, a line having a less curvature when the velocity of said writing stylus between said two touch locations on said touch surface is high than when the velocity is low.

15. The tablet of claim 14, wherein when said line type determining means determines that said writing stylus has moved on a curve between the adjacent touches, it defines the following, C(0), C(1): earlier and later writing stylus touches, respectively, C(−1): a touch one before C(0), C(2): a touch one after C(1), L1: a line connecting the touch locations of C(−1) and C(0), L2: a line connecting the touch locations of C(1) and C(2), Ra: an intersection of L1 and R2; and sets the line connecting C(0) and C(1) to a line type passing inside the sides of a triangle C(0)-Ra—C(1).

16. A method for controlling a pressure sensitive writing tablet, comprising the steps of:

generating an output signal corresponding to a touch surface pressure distribution relating to touch locations where a writing stylus touched the touch surface;

generating touch data including data on a touch location and a touch time for each touch of said writing stylus to said touch surface by sampling said output signal generated by said output signal generating step, determining if there was a touch of said writing stylus to said touch surface based on the sampled data, and, if there was a touch, detecting the touch location and touch time of said touch;

determining, based on said touch data, whether each touch of said touch data is a touch on a contiguous line input on said touch panel;

generating velocity data by calculating, based on said touch data, a velocity of said writing stylus at each segment of the contiguous line input on said touch surface, said velocity data including data relating to the calculated velocities;

determining, based on said velocity data, a type of a line connecting the touch locations of two touches that are on the contiguous line and temporally adjacent to each other in the detection order defined as adjacent touches, wherein said line type determining step sets, as a connecting line between two touch locations of adjacent touches, a line having a less curvature when the velocity of said writing stylus between said two touch locations on said touch surface is high than when the velocity is low;

producing a line drawing connecting the touch locations of the respective adjacent touches based on the line types determined by said line type determining step; and displaying the line drawing produced by said line drawing producing step.

17. The method of claim 16, wherein said displaying step displays at the back of said touch panel.

18. The method of claim 16, wherein when said line type determining step determines that said writing stylus has moved on a curve between the adjacent touches, it defines the following, C(0), C(1): earlier and later adjacent touches, respectively, C(−1): a touch one before C(0), C(2): a touch one after C(1), L1: a line connecting the touch locations of C(−1) and C(0), L2: a line connecting the touch locations of C(1) and C(2), Ra: an intersection of L1 and L2; and sets the line connecting C(0) and C(1) to a line type passing inside the sides of a triangle C(0)-Ra—C(1).

19. The method of claim 16, wherein a time interval for detecting the output signal of said touch panel by said touch data generating step is shorter than the minimum time interval defined as the time required for a user to move the writing stylus by z on said touch panel, where z represents a shortest distance between touch locations which can be identified on said touch panel.

20. A method for controlling a pressure sensitive writing tablet comprising the steps of:

generating an output signal corresponding to a touch surface pressure distribution relating to touch locations where a writing stylus touched a touch surface of a touch panel;

generating primary touch data including data on a primary touch location and a touch time for each touch of said writing stylus to said touch surface by sampling the output signal of said touch panel, determining if there was a touch of said writing stylus to said touch surface based on the sampled data, and, if there was a touch, detecting the touch location and touch time of said touch;

determining, based on said primary touch data, whether each touch of said primary touch data is a touch on a contiguous line input on said touch panel;

generating secondary touch data including data on a secondary touch location for east touch by computing the secondary touch location which is obtained from correcting, by a predetermined correction process, a primary touch location of a touch included in said primary touch data and located on the contiguous line, defined as target touch, based on primary touch locations of multiple touches, defined as correcting touches, having the respective touch times within a predetermined time range Ta including the touch time of said target touch;

producing a line drawing connecting with a selected line the secondary touch locations of two touches that are on the contiguous line and temporally adjacent to each other in the detection order, defined as adjacent touches; and displaying the line drawing produced by said line drawing producing step.

21. The method of claim 20, wherein said displaying step displays at the back of said touch panel.

22. The method of claim 20, wherein a time interval for detecting the output signal of said touch panel by said touch data generating means is shorter than the minimum time interval defined as the time required for a user to move the writing stylus by z on said touch panel, where z represents a shortest distance between touch locations which can be identified on said touch panel.

23. The method of claim 20, wherein said correcting touches in said correction process are touches at primary touch locations in a predetermined area Ao containing the primary touch location of said target touch.

24. The method of claim 23, wherein said correction process counts for each primary touch location the number of correcting touches having the same primary touch location, and selects a primary touch location having the highest count as a secondary touch location for the target touch.

25. The method of claim 24, wherein said correction process computes an average position of the primary touch locations of the correcting touches, and selects this average position as the secondary touch location for the target touch if there is no primary touch location having the highest count.

26. The method of claim 20, further comprising the steps of:

generating velocity data by calculating, based on said touch data, a velocity of said writing stylus at each segment of the contiguous line input on said touch surface, said velocity data including data relating to the calculated velocities; and determining, based on said velocity data, a type of a line connecting the secondary touch locations of the adjacent touches.

27. The method of claim 26, wherein said line type determining step sets, as a connecting line between two touch locations of adjacent touches, a line having a less curvature when the velocity of said writing stylus between said two touch locations on said touch surface is high than when the velocity is low.

28. The method of claim 27, wherein when said line type determining step determines that said writing stylus has moved on a curve between the adjacent touches, it defines the following, C(0), C(1): earlier and later writing stylus touches, respectively, C(−1): a touch one before C(0), C(2): a touch one after C(1), L1: a line connecting the touch locations of C(−1) and C(0), L2: a line connecting the touch locations of C(1) and C(2), Ra: an intersection of L1 and L2; and sets the line connecting C(0) and C(1) to a line type passing inside the sides of a triangle C(0)-Ra—C(1).

29. A control program for a pressure sensitive writing tablet, comprising the computer implemented steps of:

generating an output signal corresponding to a touch surface pressure distribution relating to touch locations where a writing stylus touched the touch surface;

generating touch data including data on a touch location and a touch time for each touch of said writing stylus to said touch surface by sampling said output signal generated by said output signal generating step, determining if there was a touch of said writing stylus to said touch surface based on to sampled data, and, if tore was a touch, detecting the touch location and touch time of said touch;

determining, based on said touch data, whether each touch of said touch data is a touch on a contiguous line input on said touch panel;

generating velocity data by calculating, based on said touch data, a velocity of said writing stylus at each segment of the contiguous line input on said touch surface, said velocity data including data relating to the calculated velocities;

determining, based on said velocity data, a type of a line connecting the touch locations of two touches that are on the contiguous line and temporally adjacent to each other in the detection order, defined as adjacent touches, wherein said line type determining means sets, as a connecting line between two touch locations of adjacent touches, a line having a less curvature when the velocity of said writing stylus between said two touch locations on said touch surface is high than when to velocity is low;

producing a line drawing connecting the touch locations of to respective adjacent touches based on the line types determined by said line type determining step; and displaying the line drawing produced by said line drawing producing step.

30. The program of claim 29, wherein when said line type determining step determines that said writing stylus has moved on a curve between the adjacent touches, it defines the following, C(0), C(1): earlier and later adjacent touches, respectively, C(−1): a touch one before C(0), C(2): a touch one after C(1), L1: a line connecting to touch locations of C(−1) ad C(0), L2: a line connecting the touch locations of C(1) and C(2), Ra: an intersection of L1 and L2; and sets the line connecting C(0) and C(1) to a line type passing inside the sides of in triangle C(0)-Ra—C(1).

31. The program of claim 29, wherein a time interval for detecting to output signal of said touch panel by said touch data generating step is shorter than to minimum time interval defined as to time required for a user to move to writing stylus by z on said touch panel, where z represents a shortest distance between touch locations which can be identified on said touch panel.

32. A control program for a pressure sensitive writing tablet, comprising the computer implemented steps of:

generating an output signal corresponding to a touch surface pressure distribution relating to touch locations where a writing stylus touched a touch surface of a touch panel;

generating primary touch data including data on a primary touch location and a touch time for each touch of said writing stylus to said touch surface by sampling the output signal of said touch panel, determining if there was a touch of said writing stylus to said touch surface based on the sampled data, and, if there was a touch, detecting the touch location and touch time of said touch;

determining, based on said primary touch data, whether each touch of said primary touch data is a touch on a contiguous line input on said touch panel;

generating secondary touch data including data on a secondary touch location for each touch by computing the secondary touch location which is obtained from correcting, by a predetermined correction process, a primary touch location of a touch included in said primary touch data and located on the contiguous line, defined as target touch, based on primary touch locations of multiple touches, defined as correcting touches, having the respective touch times within a predetermined time range Ta including the touch time of said target touch;

producing a line drawing connecting with a selected line the secondary touch locations of two touches that are onto contiguous line and temporally adjacent to each other into detection order defined as adjacent touches; and displaying the line drawing produced by said line drawing producing step.

33. The program of claim 32, wherein said correcting touches in said correction process are touches at primary touch locations in a predetermined area Ao containing the primary touch location of said target touch.

34. The program of claim 33, wherein said correction process counts for each primary touch location the number of correcting touches having the same primary touch location, and selects a primary touch location having tire highest count as a secondary touch location for the target touch.

35. The program of claim 34, wherein said correction process computes an average position of the primary touch locations of the correcting touches, and selects this average position as the secondary touch location for the target touch if there is no primary touch location having the highest count.

36. The program of claim 32, further comprising the computer implemented steps of:

generating velocity data by calculating, based on said touch data, a velocity of said writing stylus at each segment of the contiguous line input on said touch surface, said velocity data including data relating to the calculated velocities; and determining, based on said velocity data, a type of a line connecting the secondary touch locations of the adjacent touches.

37. The program of claim 36, wherein said line type determining step sets, as a connecting line between two touch locations of adjacent touches, a line having a less curvature when the velocity of said writing stylus between said two touch locations on said touch surface is high than when the velocity is low.

38. The program of claim 37, wherein when said line type determining step determines that said writing stylus has moved on a curve between the adjacent touches, it defines the following, $C(0)$, $C(1)$: earlier and later writing stylus touches, respectively, $C(-1)$: a touch one before $C(0)$, $C(2)$: a touch one after $C(1)$, L1: a line connecting the touch locations of $C(-1)$ and $C(0)$, L2: a line connecting the touch locations of $C(1)$ and $C(2)$, Ra: an intersection of L1 and L2; and sets the line connecting $C(0)$ and $C(1)$ to a line type passing inside the sides of a triangle $C(0)$-Ra—$C(1)$.

39. The program of claim 32, wherein a time interval for detecting the output signal of said touch panel by said touch data generating means is shorter than the minimum time interval defined as the time required for a user to move the writing stylus by z on said touch panel, where z represents a shortest distance between touch locations which can be identified on said touch panel.

* * * * *